US00RE41505E

(19) United States
(12) Reissued Patent
Herman

(10) Patent Number: US RE41,505 E
(45) Date of Reissued Patent: Aug. 17, 2010

(54) PACKAGING TAPE AND DISPENSING TAPE GUN SYSTEM

(76) Inventor: Justin R. Herman, 23419 High Rd., Oakwood Village, OH (US) 44146

(21) Appl. No.: 12/286,518

(22) Filed: Sep. 30, 2008

Related U.S. Patent Documents

Reissue of:
(64) Patent No.: 7,393,430
Issued: Jul. 1, 2008
Appl. No.: 11/244,852
Filed: Oct. 7, 2005

U.S. Applications:
(60) Provisional application No. 60/640,630, filed on Dec. 31, 2004.

(51) Int. Cl.
*B32B 37/14* (2006.01)

(52) U.S. Cl. ..... 156/256; 156/577; 156/579; 225/77; 225/80; 225/90

(58) Field of Classification Search ..... 156/256, 156/574, 577, 579; 225/46, 47, 77, 80, 90
See application file for complete search history.

(56) References Cited

U.S. PATENT DOCUMENTS

| | | | | | |
|---|---|---|---|---|---|
| 3,740,265 | A | * | 6/1973 | Springer | 427/548 |
| 5,236,540 | A | * | 8/1993 | Shi | 156/523 |
| 6,098,685 | A | * | 8/2000 | Maeda | 156/391 |
| 6,585,023 | B2 | * | 7/2003 | Azuhata | 156/574 |
| 6,601,630 | B2 | * | 8/2003 | Kang | 156/574 |
| 6,705,373 | B1 | * | 3/2004 | Yu Chen | 156/523 |
| 6,799,623 | B1 | * | 10/2004 | Cheng | 156/527 |
| 6,913,060 | B2 | * | 7/2005 | Chandaria | |
| 7,096,915 | B2 | * | 8/2006 | Yu Chen | 156/577 |
| 2006/0289118 | A1 | * | 12/2006 | Yi-Ju | 156/577 |

* cited by examiner

*Primary Examiner*—Mark A Osele
(74) *Attorney, Agent, or Firm*—John D. Gugliotta, PE, Esq.

(57) ABSTRACT

A tape gun is provided having a pistol-grip type handle supporting a tape dispensing roller upon which a roller of tape is mounted for rotatable dispensing. A tape pressure plate guides the dispensed tape into a package, with a guide roller mounted in the tape path between the dispensing roller and the pressure plate. The roller is made of or incorporates a magnetic material, such as a neodymium magnet or equivalent. The packaging tape itself incorporates a magnetically attractive material, such as iron dust or wires or other magnetic metal within or on the tape backing in a manner that comes in contact with the magnetic guide roller.

14 Claims, 3 Drawing Sheets

PACKAGING TAPE AND DISPENSING TAPE GUN SYSTEM

Matter enclosed in heavy brackets [ ] appears in the original patent but forms no part of this reissue specification; matter printed in italics indicates the additions made by reissue.

RELATED APPLICATIONS

The present invention claims the benefit of U.S. Provisional Patent No. 60/640,630, filed on Dec. 31, 2004 and incorporated by reference as if fully rewritten herein.

BACKGROUND OF THE INVENTION

1. Field of the Invention

The present invention relates generally to adhesive tape dispensers and, more particularly, to an improved packaging tape and dispensing tape gun combination.

2. Description of the Related Art

There are numerous types of adhesive tapes that have a wide variety of uses. One of the more frequently used adhesive tapes is packaging tape which is used to secure the flaps of boxes and packages for shipping. This type of tape is wide and is fairly difficult to pull off a roll by hand and maneuver into position around a package. A device was therefore developed to assist in dispensing and applying this type of tape to a package. The device is commonly known as a tape gun. While tape guns have made it easier to dispense packaging tape, they are cumbersome. However, the most common difficulties encountered in using such a device revolves around the loading of the tape, the storing of the loaded dispenser, and the handling of the dispenser after tearing off a piece of tape. In all these situations, the free, dispensed end of the tape has a tendancy to stick to itself or otherwise become entangled due to the inherent adhesive nature of such tape.

In order to overcome these disadvantages, several devices have been proposed in the prior art for dispensing packaging tape without the use of a tape gun. While these prior art devices have allowed for dispensing of tape without a tape gun, they have not always been easy to operate with one hand inasmuch as they are flimsy, difficult to grip and frequently allow the user's hand to come into contact with the rapidly rotating packaging tape, potentially causing minor injury to the user. Such devices lack the handling capability that results from a handled "gun" design, as well as the ability of these devices to apply smooth, even pressure to the tape as it is being dispensed.

Consequently, there still exists the need in the art for a simple, effective adhesive tape dispenser that is adapted to be easily gripped in one hand and allows the packaging tape to be easily dispensed therefrom with one hand, yet that protects the hand of the user during operation.

SUMMARY OF THE INVENTION

It is therefore an object of the present invention to provide an improved packaging tape and dispensing tape gun system.

It is a feature of the present invention to provide an improved packaging tape that includes ferro-philic material embedded therein, in combination with a dispensing tape gun that incorporates a magnetic roller.

Briefly described according to one embodiment of the present invention, a tape gun is provided having a pistol-grip type handle supporting a tape dispensing roller upon which a roll of tape is mounted for rotatable dispensing. A tape pressure plate guides the dispensed tape onto a package, with a guide roller mounted in the tape path between the dispensing roller and the pressure plate. The roller is made of or incorporates a magnetic material, such as a neodymium magnet or equivalent. The packaging tape itself incorporates a magnetically attractive material, such as iron dust or wires or other magnetic metal within or on the tape backing in a manner that comes in contact with the magnetic guide roller. In this manner, as tape is cut free of the cutting blade, the remaining tab of dispensed tape remains attached to the guide roller and prevents this flap from unintentionally sticking to itself or other unintented objects.

These and other novel features of the invention will be more fully described herein below.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures.

1. Detailed Description of the Figures

The adhesive tape dispenser of the present invention is shown generally by the number 10 for dispensing an improved packaging tape shown generally by the number 12.

Figure 1:
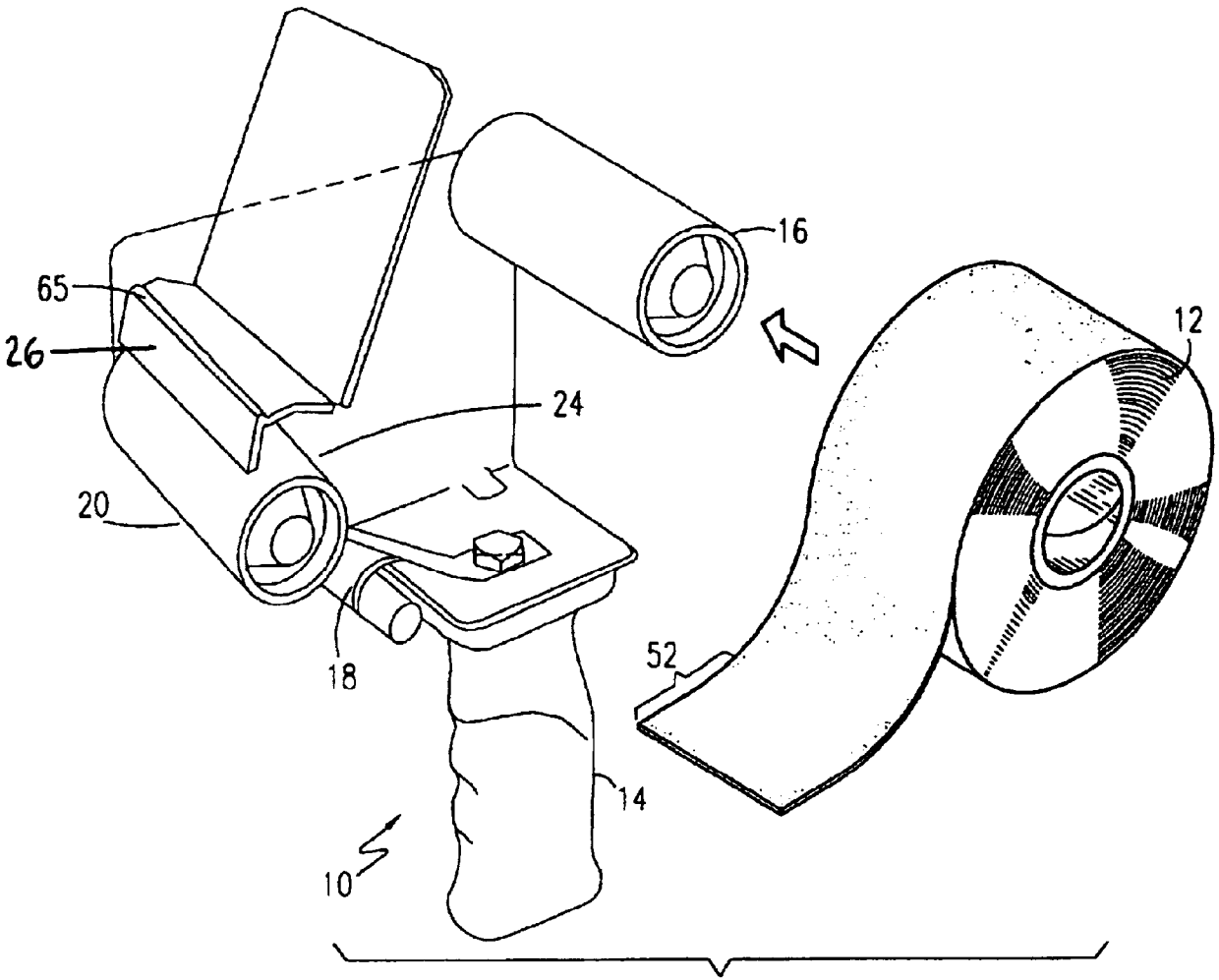
FIG. 1 is a partial exploded perspective view of a dispensing tape gun 10 and packaging tape 12 combination according to the preferred embodiment of the present invention.
Figure 3:
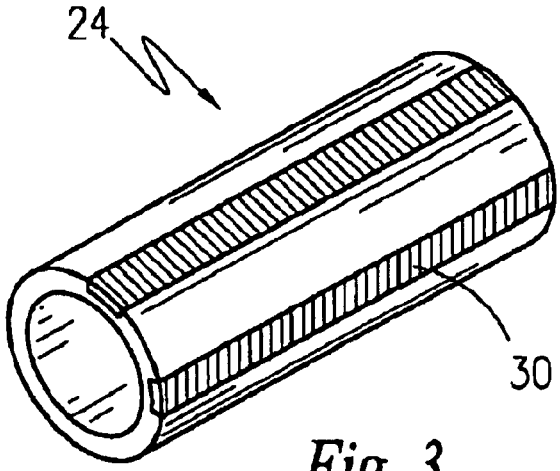
FIG. 3 is a perspective view of a guide roller 24 according to an alternate embodiment of the present invention.
Figure 4A:
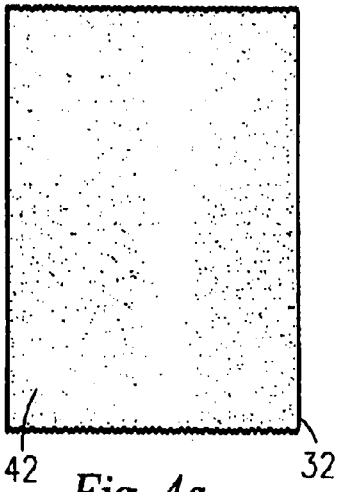
FIGS. 4A through 4E are top plan view of the packaging tape 12 according to various alternate embodiments.
Figure 4B:
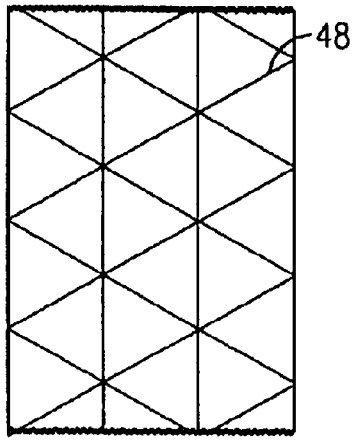
Figure 4C:
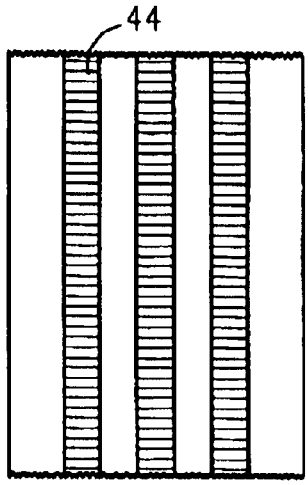
Figure 4D:
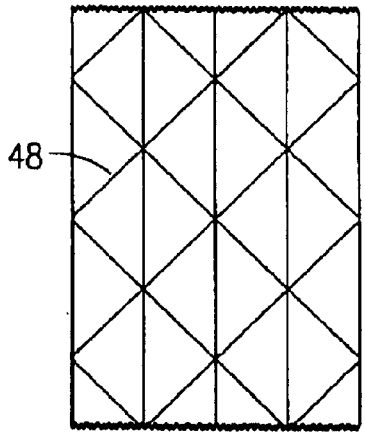
Figure 4E:
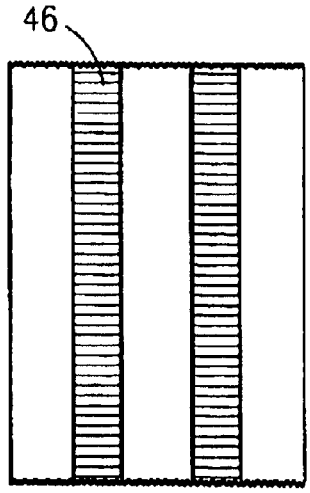

As shown in FIG. 1, the dispenser 10 comprises a base 14 that is preferably molded from plastic, metal or some other suitable material. Base 14 supports a tape dispensing roller 16 that rotatably supports a roll of packaging tape 12. It will be understood by those skilled in the art that the roller support 20 may be integrally formed or alternatively may be connected to the base 14 by a suitable means such as adhesive or rivets. The base 14 comprises a pistol-grip like handle to ergonomically provide for easy manual manipulation. A tape guide 18 parallels the tape roller 16 and is separated by a channel 20 from a guide roller 24. The guide roller 24 is made of or incorporates a magnetic material, such as a neodymium magnet or equivalent. It is anticipated that, as a first alternate embodiment, instead of the guide roller 24 being magnetic that a metal guide 26, between the roller 20 and cutting blade 65, be magnetic in order to accomplish the teachings of the present invention. As shown best in FIG. 3, in a second alternate embodiment the guide roller 24 can incorporate magnetic inserts 30, inlaid in various patterns, to equivalently provide a magnetic surface about the outer perimeter of the roller 24.

Figure 2:
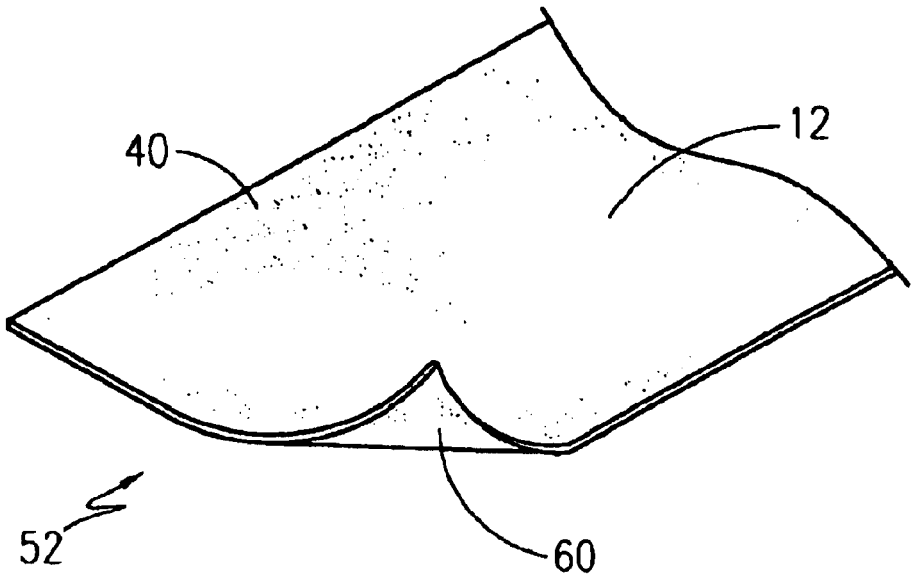
FIG. 2 is an exploded perspective view of the packaging tape 12 for use therewith.

As shown in conjunction with FIG. 2, utilizing either embodiment, the packaging tape 12 itself incorporates a magnetically attractive material 40, such as iron dust or wires or other magnetic metal within or on the tape backing in a manner that comes in contact with the magnetic guide roller. In conjunction with FIGS. 4A-4E, various alternate embodiments for incorporating magnetically attractive material are shown, such as with iron particles or dust 42, magnetically attractive metal strips in ⅛ inch wide stripes 44 or ½ inch wide stripes 46 of various sizes and numbers, or by various patterns of metal wire 48.

In any embodiment, a serrated blade 65 is adapted to cut the adhesive tape 12 when tape 12 is brought into contact with it. While blade 65 is shown with serrations, it will be understood by those in the art that any type of blade that will cut tape 26 will be suitable without departing from the scope or intent of this invention.

2. Operation of the Preferred Embodiment

Utilizing any combination of embodiments of tape 12 and roller 24, as the tape 12 is cut free of the cutting blade 50, the remaining tab 52 of dispensed tape 12 remains attached to the guide roller 24 and prevents the adhesive 60 on the tab 52 from unintentionally sticking to itself or other unintended objects.

The foregoing description of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

The invention claimed is:

1. An improved packaging tape and dispensing tape gun system comprising:

magnetically attracted material embedded within a backing of packaging tape, said packaging tape rolled for dispensing from a tape gun; and a dispensing tape gun that incorporates a magnetic guide roller.

2. The system of claim 1, wherein said tape gun further comprises:

a pistol-grip type handle supporting a tape dispensing roller upon which said roll of tape is mounted for rotatable dispensing;

a tape pressure plate that guides said dispensed tape;

wherein said magnetic guide roller is mounted in a tape path between said dispensing roller and said pressure plate.

3. The system of claim 2, wherein said guide roller is made of or incorporates a magnetic material such as a neodymium magnet or equivalent.

4. The system of claim 1, wherein said packaging tape itself incorporates a magnetically attractive material selected from the group comprising iron dust and metallic wires, said magnetically attractive material being within or on a tape backing in a manner that comes in contact with said magnetic guide roller.

5. A packaging tape dispenser comprising:

a base that supports a tape dispensing roller that rotatably supports a roll of packaging tape;

a tape guide affixed to said base in a manner that parallels said tape dispensing roller;

a channel formed between said tape guide and a guide roller;

wherein said guide roller incorporates a magnetic material; and a blade adapted to cut said packaging tape when said tape is brought into contact with it.

6. The packaging tape dispenser of claim 5, wherein said magnetic material is a neodymium magnet.

7. The packaging tape dispenser of claim 5, wherein said guide roller incorporate magnetic inserts within the circumference of said guide roller top provide a magnetic surface about the outer perimeter of the roller.

8. The packaging tape dispenser of claim 5, wherein said base a pistol-grip like handle to ergonomically provide for easy manual manipulation.

9. The packaging tape dispenser of claim 5, wherein said roll of packaging tape incorporates a magnetically attractive material in a manner that comes in contact with said magnetic guide roller.

10. A method for dispensing packaging tape from a tape gun, said method comprising:

a. providing a tape gun having a magnetic guide roller;

b. incorporating a magnetically attractive material into said roll of packaging tape in a manner that comes in contact with said magnetic guide roller; and c. cutting said tape during dispensing such that as said tape is cut free, any remaining tab of dispensed tape remains attached to said guide roller and prevents this flap from unintentionally sticking to itself or other unintended objects.

*11. A packaging tape dispenser comprising:*

*a base that supports a tape dispensing roller that rotatably supports a roll of packaging tape;*

*a tape guide affixed to said base in a manner that parallels said tape dispensing roller, wherein said tape guide incorporates a magnetic material;*

*a channel formed between said tape guide and a guide roller whereby said roll of packaging tape is dispensed through said channel in a manner where said roll of packaging tape comes in contact with said magnetic material on said tape guide; and*

*a blade adapted to cut said packaging tape when said tape is brought into contact with it.*

*12. The packaging tape dispenser of claim 11, wherein said magnetic material is neodymium magnet.*

*13. The packaging tape dispenser of claim 11, wherein said base comprises a pistol-grip handle to ergonomically provide for easy manipulation.*

*14. The packaging tape dispenser of claim 11, wherein said roll of packaging tape incorporates a magnetically attractive material in manner that comes in contact with said magnetic material on said tape guide.*

* * * * *